Jan. 1, 1935. C. E. FERREE ET AL 1,986,052
VARIABLE INTENSITY LAMP
Filed Aug. 24, 1933 2 Sheets-Sheet 1
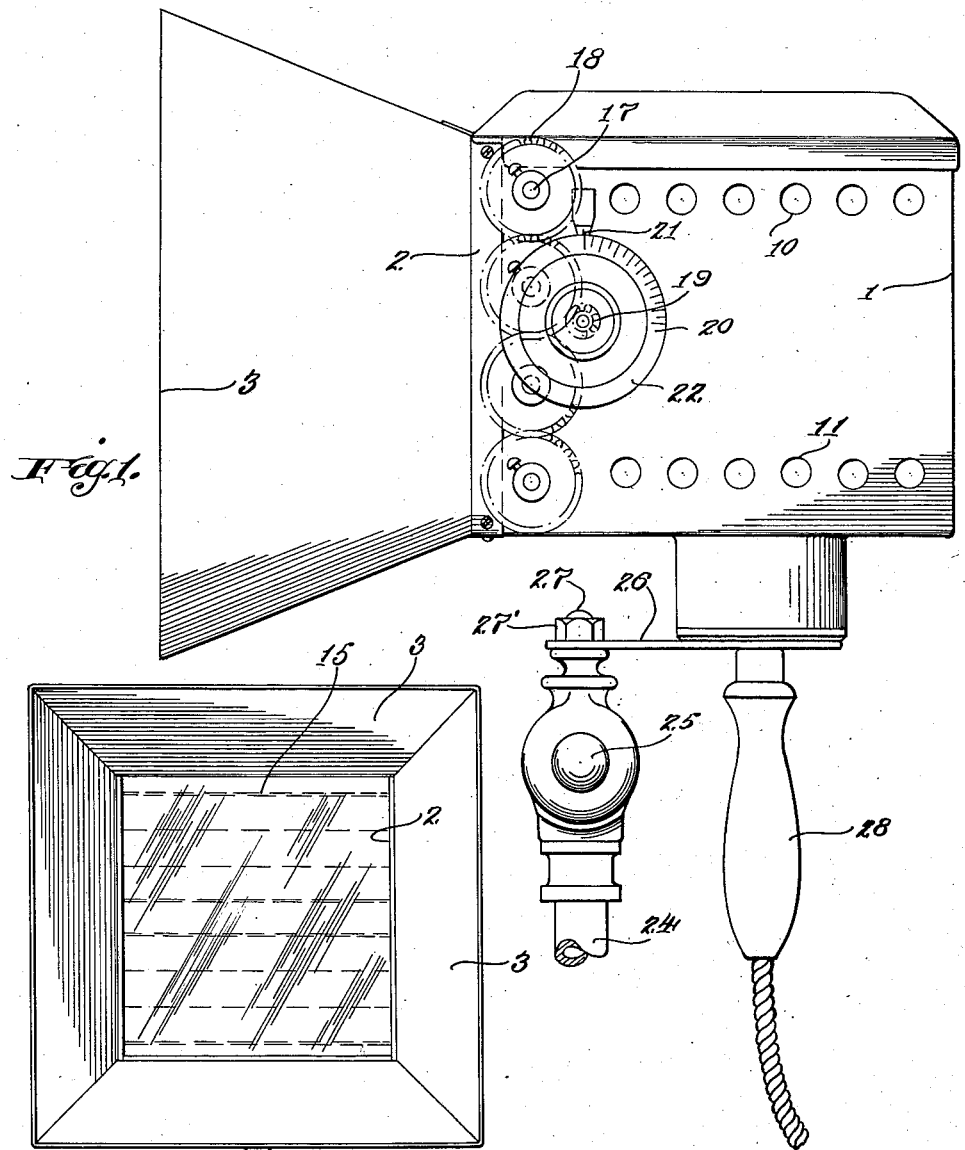

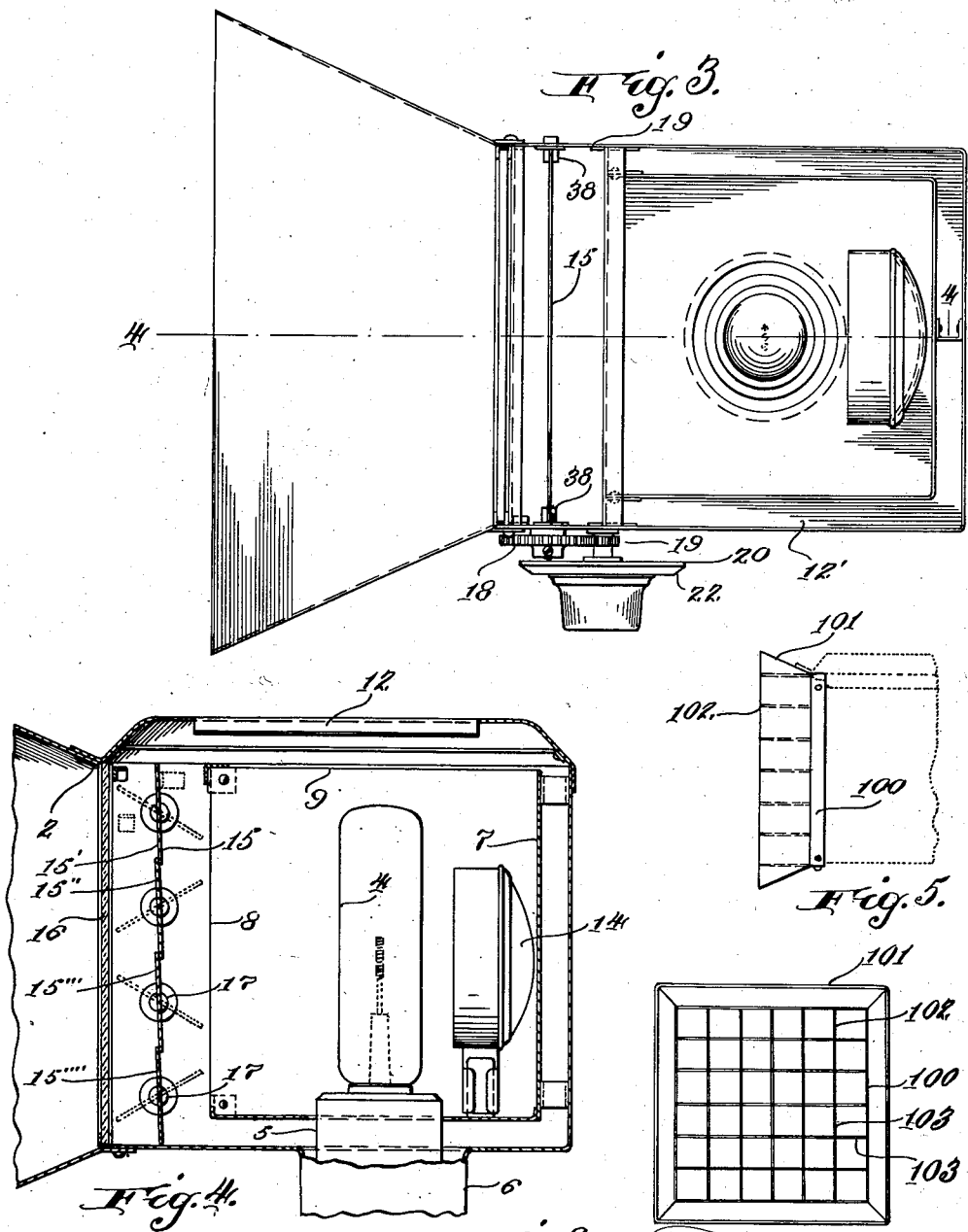

Patented Jan. 1, 1935

1,986,052

UNITED STATES PATENT OFFICE 1,986,052

VARIABLE INTENSITY LAMP

Clarence Errol Ferree and Gertrude Rand Ferree, Baltimore, Md.

Application August 24, 1933, Serial No. 686,488

11 Claims. (Cl. 240—1)

The invention relates to a variable illumination lamp which can be used either as a light meter or as a lamp for local illumination. It is of particular importance that the intensity of light is changed without change of color value and without change of intensity of the source and it is also of importance that the intensity of the light is varied in connection with a scale so that in each adjusted position of the apparatus the exact intensity of the resulting illumination at a definite or known distance may be predetermined.

An important use of the apparatus is in lighting surfaces for the determination and measurement of the exact amount of light needed for any particular type of work or in any particular lighting situation. The variable illumination unit of the invention is taken to the place where the test is to be made and the determination of the intensity of light required is made there under the conditions actually presented and to be met by the prospective installation. The need of costly trial installations for determining the amount of light required and the measurement of the resulting light obtained are thus made unnecessary.

The apparatus is also of use in ophthalmology and optometry for the determination of the amount of light needed to give optimum efficiency and comfort for each patient examined. This is especially important in case of old eyes and eyes defective because of errors in refraction and various types of disease. The unit is also valuable to the ophthalmologist and optometrist as a means of giving a variable illumination to test charts and other test surfaces used in examination of the eye. With this unit, these charts and surfaces can be evenly illuminated with well diffused light over a wide range of measured intensities. For certain types of examination, a very low intensity gives the best results; for others, a high intensity; and for still others, a medium intensity is desirable. For example, in general, a low illumination is best for the selection of a correcting glass for the eye, also for certain tests for astigmatism; for other tests for astigmatism, a high illumination gives the best results. For the illumination of tangent screens and other test surfaces used in the examination for diseases of the eye, a wide range of intensity is required and there are numerous other instances in which a variable illumination lamp is desirable.

As a means for local lighting, the unit is very serviceable as a reading lamp and as a light for any type of work requiring different intensities of light. In a reading lamp, particularly when it is to be used by different people or by the same person with different sizes of print, different conditions of the eye, and so forth, it is often desirable to regulate the amount of light delivered on the page. The variable illumination light of the invention is also of considerable advantage in laboratories where it is found desirable to have a variation of intensity without any change in composition or color of the light. For various kinds of work, the need of a variable illumination light will be easily appreciated. When used as a local lighting unit, a glare baffle, which may be of the egg-crate type or any other suitable type, is considered desirable.

In the accompanying drawings we have illustrated a variable intensity lighting unit embodying the invention in the preferred form and also with certain modifications.

In the drawings:—

Figure 1 is a side elevation of the lighting unit to be described.

Figure 2 is a front elevation.

Figure 3 is a top plan view of the unit with the top or cover removed.

Figure 4 is a vertical section on the line 4, 4 in Figure 3.

Figure 5 is a fragmentary section corresponding to Figure 1, showing a modified form of the unit, including an egg crate baffle.

Figure 6 is a front view of the same.

Referring to the drawings by numerals, each of which is used to indicate the same or similar parts in each of the different figures, the lighting unit as shown comprises a casing or housing 1, which may be rectangular as shown or of any suitable shape. This casing or housing 1 is open at the front at 2 and provided with a forwardly flaring shield 3 surrounding the opening and projecting forwardly therefrom.

The source of illumination shown which is in the form of a high intensity light bulb 4 is mounted near the center of the housing in a socket 5 which as illustrated is supported in a depending tubular portion 6 of the housing. The bulb 4 is enclosed in an inner housing 7 which is spaced inwardly from the housing and suitably secured thereto, being open at the front at 8 and having openings 9 in the top and each side. The object of the inner housing is to provide ventilation and prevent heating of the outer casing by means of the air jacket thus provided. To this end the outer casing is provided with top and bottom perforations 10 and 11 at each side with top ventilating slots 12 spaced away from the openings 9, giving circulation of air jacket 12' due to the heat generated by the bulb. The top of the casing as shown is in the form of a removable cover 13.

The purpose of the inner casing 7 is not only to provide a ventilating draft, but to shield the openings in the outer casings 10, 11, 12, so as to prevent glare and the escape of light.

Within the inner casing 7 and immediately behind the source of illumination 4, we have shown a concave reflector 14. The purpose of the reflector is to give the full benefit of the source of light at the front and it is not in any way essential to the principles of the invention, and the inner surfaces of the inner housing 7 may be of a reflecting nature or otherwise, either flat white or of metallic lustre.

The intensity of the light transmitted forwardly through the opening 2 is regulated by thin movable opaque plates or vanes 15 which are arranged to completely close the opening 2 at the front and to move from this closed position in which they are at right angles to the light rays from the source and to a line normal to the plane of the opening 2 to a series of positions at successively increasing angles to the plane of the opening 2, finally reaching a position in which they are at right angles to the plane at the opening 2, in which position they are substantially parallel to the light rays and afford practically no obstruction to the light. In this way the intensity of the light is varied from zero to 100% of the light from the source which may be passed through the opening 2.

To properly diffuse the light and prevent glare at the front and the projection of shadows of the vanes on the work, a diffusing plate 16 is mounted in or in line with the opening 2, completely covering the same. This may be of any suitable glass so arranged as to diffuse the light and prevent the transmission of the individual rays. In the preferred form this is accomplished without greatly reducing the intensity of the light.

The vanes 15 are individually indicated by reference characters 15', 15², 15³ and 15⁴. These plates or vanes are mounted on suitable journal pins 17 at their ends which, in turn, rotate in suitable bearings 38 seated in the wall 19 of the casing 1. Each of the journal pins 17 carries secured thereto a toothed gear 18, all four of the gears 18 on the pins 17 of the vanes 15', 15², 15³ and 15⁴ being arranged to mesh, one with the other, successively in a continuous train, and any one of these gears 18 is engaged by a drive pinion 19 carried by a calibrated circular rotary gauge plate 20 which cooperates with a stationary indicator 21 on the outside of the casing. In the form of the invention shown, the pinion 19 has one fourth as many teeth as has each of the tooth gears 18, so that a complete rotation of the gauge plate 20 serves to turn the vanes 15 through an angle of 90° from completely closed to completely opened position or vice versa.

The calibrations 22 are determined by testing or otherwise so that certain standard intensities of illumination, assuming that a bulb of standard intensity is used, are given at each of the points 22 on the indicator plate as it comes opposite the stationary indicating point 21.

In accordance with the preferred form of the invention, the housing 1 is mounted on an upright stand 24, having a horizontal pivot 25 near the top and a plate 26 secured to the stand above the pivot 25, and adapted to rotate about an upright pivot or bolt 27 to any desired angular position so that the mounting of the light housing is in this way made universal. The position of the housing and the direction of the rays may be controlled in any suitable manner at the will of the operator, the handle 27 being grasped by the operator for this purpose. There is also clamping means 29 and 27' for holding the housing in adjusted position as to its angularity. It will be understood, however, that any suitable support may be provided and that the invention is in no wise limited to the supporting means shown.

Figures 5 and 6 show a modified form of the light in which the casing 100 is provided with a relatively short flaring shield 101 in which is arranged an egg crate baffle 102 for eliminating the glare, particularly when the light is used for local illumination as for reading and surgical work and the like. This comprises intersecting baffle plates 103 parallel to the focal axis and preferably of considerable width as shown. The baffle plates preferably have dull finished surfaces. This baffle member disposes of any probability of glare when the unit is used as a reading lamp or for surgical purposes or the like including any and all work requiring a lighting unit of adjustable intensity.

Aside from and in addition to the use of this lamp as a source of variable illumination for local purposes, as for reading and any other pursuit in which a change of intensity without a change of color may be desirable, it has a very important function as a testing device for oculists. Among others there are two important services which can be rendered by this apparatus in optical work. The oculist can determine for the patient the intensity of illumination, which will give him an acuity which is satisfactory for all his needs or, if that is not possible to attain, the intensity which gives him the best acuity. For this purpose a means of illuminating the acuity chart over a wide range of intensities without changing color of the light is needed. The apparatus of the invention gives a range from zero to any desired number of foot candles at any predetermined distance.

Also, the lighting specialist can determine the intensity which gives the most comfortable illumination for reading or in any occupation which is to be followed in an area to be illuminated in accordance with such tests, and the lamp can be used as a floor lamp as aforesaid or in any desired form for lighting a reading page and other horizontal and inclined surfaces, as well as for the illumination of test charts.

It will be understood that a source of illumination in the form of a lighting bulb 4 of predetermined intensity having been placed in the housing and a suitable current supplied, the plates 15 are rotated to any angular position to give the desired intensity as determined by the selection of the uses as indicated by the calibrations 22 on the plate 20 which cooperates with the indicator 21. The plates 15 constitute mechanical means for cutting off part of the rays to vary the intensity of the light diffusing plate 16 serves to eliminate shadows and bars of light, the radiation of light from the plate 16 giving a uniform illuminating effect which is varied in intensity as the vanes 15 are opened and closed, the change of intensity being without change of intensity of the source and without change of color and without change of the size, shape or position of the illuminated area.

It will also be understood that the presence of the indicator is more or less optional and may be dispensed with when the unit is to be used merely as a reading lamp or for the illumination of a work room when variable intensity is desired.

We have thus described specifically and in detail a variable intensity lighting unit embodying the features of our invention in the preferred form in order that the manner of constructing, operating, applying and using the invention may be clearly understood. However, the specific terms herein are used in a descriptive rather than in a limiting sense, the scope of the invention being defined in the claims.

What we claim as new and desire to secure by Letters Patent is:

1. In a lighting unit, a housing having a source of light therein and a series of movable shutter vanes which in certain positions are spaced apart to provide shutter openings in the casing for the passage of light from said casing, and means for moving the vanes to change the size of the shutter openings cutting off varying portions of the rays, the shutter vanes being adapted to vary the intensity of the light transmitted from the casing without any change of the intensity of the source or of the position of the illuminated area or of the color of the transmitted light and a diffusing member outside the shutter intercepting the transmitted rays whereby all the light passed through the shutter is fully diffused and an illuminated field free of shadows is obtained.

2. In a lighting unit, a housing having a source of light therein and a series of movable shutter vanes which in certain positions are spaced apart to provide shutter openings in the casing for the passage of light from said casing, and means for moving the vanes to change the size of the shutter openings cutting off varying portions of the rays, the shutter vanes being adapted to vary the intensity of the light transmitted from the casing without any change of the intensity of the source or of the position of the illuminated area or of the color of the transmitted light and a diffusing member outside the shutter intercepting the transmitted rays, whereby all the light passed through the shutter is fully diffused and an illuminated field free of shadows is obtained, and a reflector on the opposite of said source from the openings.

3. In a lighting unit, a housing having a source of light therein and a series of movable shutter vanes which in certain positions are spaced apart to provide shutter openings in the casing for the passage of light from said casing, and means for moving the vanes to change the size of the shutter openings cutting off varying portions of the rays, the shutter vanes being adapted to vary the intensity of the light transmitted from the casing without any change of the intensity of the source or of the position of the illuminating area or of the color of the transmitted light and a diffusing member outside the shutter intercepting the transmitted rays whereby all the light passed through the shutter is fully diffused and an illuminated field free of shadows is obtained, and means for indicating the intensity of the illumination of the field.

4. In a lighting unit, a housing having a source of light therein and a series of movable shutter vanes which in certain positions are spaced apart to provide shutter openings in the casing for the passage of light from said casing, and means for moving the vanes to change the size of the shutter openings cutting off varying portions of the rays, the shutter vanes being adapted to vary the intensity of the light transmitted from the casing without any change of the intensity of the source or of the position of the illuminated area or of the color of the transmitted light and a diffusing member outside the shutter intercepting the transmitted rays whereby all the light passed through the shutter is fully diffused and an illuminated field free of shadows is obtained, the shutter vanes having light absorbing surfaces and being each mounted to rotate about an axis of the vane, and means for rotating each vane oppositely to the direction of rotation of the adjacent vanes.

5. In a lighting unit, a housing having a source of light therein and a series of movable shutter veins which in certain positions are spaced apart to provide shutter openings in the casing for the passage of light from said casing, and means for moving the vanes to change the size of the shutter openings cutting off varying portions of the rays, the shutter vanes being adapted to vary the intensity of the light transmitted from the casing without any change of the intensity of the source or of the position of the illuminated area or of the color of the transmitted light and a diffusing member outside the shutter intercepting the transmitted rays whereby all the light passed through the shutter is fully diffused and an illuminated field free of shadows is obtained, the shutter vanes being each mounted to rotate about an axis of the vane, means for rotating each vane oppositely to the direction of rotation of the adjacent vanes and means for indicating the intensity of the light, said means being connected to the rotating means to move in correspondence therewith.

6. In a lighting unit, a housing having a source of light therein and a series of shutter openings through which the light from said source is transmitted, movable means for varying the size of said shutter openings to control the passage of light from said casing, and means operating said means to change the size of the shutter openings, thereby cutting off varying portions of the rays which are transmitted from the casing whereby the intensity of the light is varied without changing the color or the intensity of the source or the position of the illuminated area or the color of the transmitted light and a diffusing member outside the shutter intercepting the transmitted rays whereby all the light released from said opening is fully diffused and an illuminated field free of shadows is obtained.

7. In a lighting unit, a housing having a source of light therein, a series of shutter openings through which the light from said source is transmitted, movable means for varying and controlling the size of said shutter openings controlling the passage of light from said casing, and means for operating said vanes to change the size of the shutter openings, thereby cutting off varying portions of the rays which are transmitted from the casing whereby the intensity of the light is varied without changing the color or the intensity of the source or the position of the illuminated area or the color of the transmitted light, and means for intercepting and diffusing all the rays passing the shutter, making the field of illumination free of shadows.

8. In a lighting unit, a housing having a source of light therein, and a series of shutter openings through which the light from said source is transmitted, movable means for varying the size of said shutter openings to control the passage of light from said casing, and means for operating said means to change the size of the shutter openings, thereby cutting off varying portions of the rays which are transmitted from the casing whereby the intensity of the light is varied without changing the color of the intensity of the source or the position of the illuminated area or the color of the transmitted light and a diffusing member intercepting all the rays passing said openings whereby all the light released from said openings is fully diffused and an illuminated field free of shadows is obtained.

9. In a lighting unit, a housing having a source of light therein, and a series of shutter openings through which the light from said source is transmitted, movable means for varying the size of said shutter openings to control the passage of light from said casing, and means for operating said movable means to change the size of the shutter openings, thereby cutting off varying portions of the rays which are transmitted from the casing whereby the intensity of the light is varied without changing the color or the intensity of the source or the position of the illuminated area or the color of the transmitted light, and a diffusing member outside the shutter whereby all the light released from said openings is fully diffused and an illuminated field free of shadows is obtained and an egg crate baffle for cutting off the widely divergent rays.

10. In a lighting unit, a housing having a source of light therein, a series of shutter openings through which the light from said source is transmitted, movable means for varying the size of said shutter openings to control the passage of light from said casing, and means for operating said movable means to change the size of the shutter openings, thereby cutting off varying portions of the rays which are transmitted from the casing whereby the intensity of the light is varied without changing the color or the intensity of the source or the position of the illuminated area or the color of the transmitted light, and a diffusing member outside the shutter whereby all the light released from said opening is fully diffused and an illuminated field free of shadows is obtained, and a reflector on the opposite side of said source from said shutter openings.

11. In a lighting unit a housing having a source of light therein, the casing having a series of shutter openings and movable shutter members with light absorbing surfaces and means for moving the said movable shutter members to cut off varying portions of the rays whereby the intensity of the light is varied without changing the intensity of the source and a diffusing plate outside the shutter through which all the light from said shutter member passes whereby the light is fully diffused, giving an illuminated field of constant location free of shadows.

CLARENCE ERROL FERREE.
GERTRUDE RAND FERREE.